Figure 1:
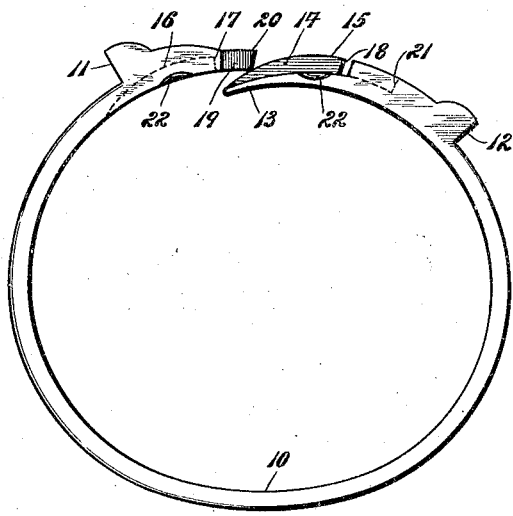

J. H. COFFMAN.
COUPLING CLAMP.
APPLICATION FILED SEPT. 24, 1919.

1,330,737.

Patented Feb. 10, 1920.

WITNESS:
Alfred J. Bratton

Jacob H. Coffman
INVENTOR.

BY
Victor J. Evans
ATTORNEY.

UNITED STATES PATENT OFFICE.

JACOB H. COFFMAN, OF WESTMONT, NEW JERSEY.

COUPLING-CLAMP.

1,330,737.         Specification of Letters Patent.    Patented Feb. 10, 1920.

Application filed September 24, 1919. Serial No. 325,959.

*To all whom it may concern:*

Be it known that I, JACOB H. COFFMAN, a citizen of the United States, residing at Westmont, in the county of Camden and State of New Jersey, have invented new and useful Improvements in Coupling-Clamps, of which the following is a specification.

The invention relates to clamps and has for an object to provide a clamp for effecting a coupling, as for instance in hose couplings to clamp the hose securely around the particular coupling or element to which the hose is connected.

The invention comprehends among other features, a clamp which is preferably formed as a single unit and made of a spring-like material, providing a band adapted to encircle the hose or other member after which the ends of the band are forced into over-lapping and locking engagement against the spring-like action of the material from which the band is made.

Although I am aware that various forms of hose clamps have been devised heretofore and which in fact are formed of single pieces of material, I aim to provide a hose clamp of a very simple construction, effective in its operation and in which the ends of the band when arranged in locking relation, are held against a relative longitudinal movement, as well as a relative sidewise movement.

In the further disclosure of the invention, reference is to be had to the accompanying drawings, constituting a part of this specification, in which similar characters of reference denote corresponding parts in all the views, and in which,—

Figure 1 — is a side elevation of the clamp showing the ends in unlocked relation.

Figure 2:
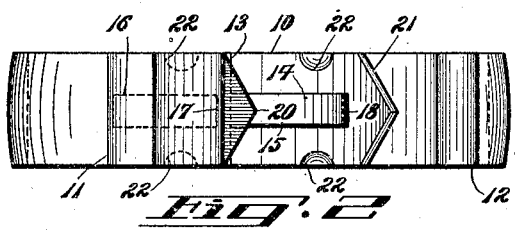

Fig. 2 — is a plan view of the structure as shown in Fig. 1.

Figure 3:
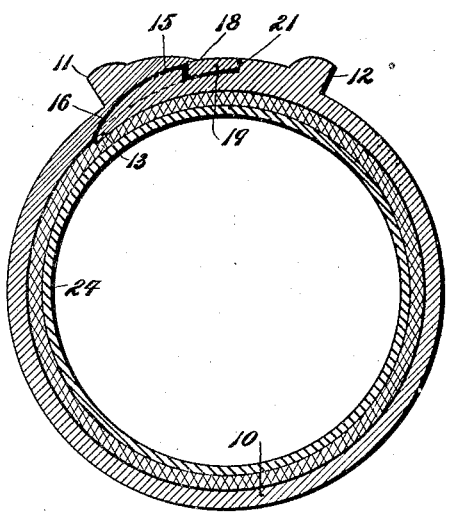
Figure 4:
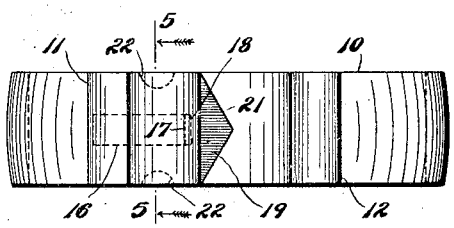
Figure 5:
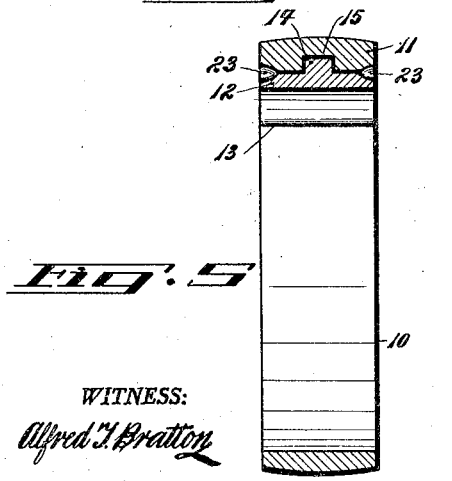

Fig. 3 — is a vertical sectional view of the clamp showing the ends locked.
Fig. 4 — is a plan view of the clamp showing the ends locked, and Fig. 5 — is a vertical transverse sectional view taken on the line 5—5 in Fig. 4.

Referring more particularly to the views, I provide a substantially circular band 10 preferably made of a spring-like material which has a head 11, formed at one end thereof, and a head 12 adjacent the other end 13 thereof. The heads 11, 12, project beyond the periphery of the band and the end 13 is tapered so that when the two ends of the band are brought together into locked relation as will be hereinafter more fully set forth, the tapered end 13 will fit snugly against the inner face of the body of the band.

Between the head 12 and the extremity of the end 13, there is provided an upstanding locking and retaining lug 14 having a tapered upper surface 15, which lug is adapted to be received in a corresponding undercut groove 16 in the underside of the other end of the band and which is adapted to overlap the end 13, a wall 17 of the groove 16 being inclined to correspond to the inclination of the end wall 18 of the lug 14 so that when the lug 14 on the end 13 is engaged in the groove 16 of the other overlapped end of the band, the said ends of the band will be secured in relatively locked position and can only be released by a downward pressure on the end 13 tending to remove the locking lug 14 from the groove 16, it being understood that the resiliency of the metal or material from which the band is made, coöperates in insuring the locked relation of the ends.

The head 11 at its extremity or end 19 is formed with a pointed nose 20, the sides of which are relatively tapered to form a point and the end of the head 12 is formed with a V cut 21 having its sides tapered to conform to the taper of the sides of the nose so that when the two ends of the band are secured in locked relation by the lug 14, the nose 20 will snap into the groove or V cut 21 and thus any side movement of the one head relative to the other, will be prevented so that with the locking lug and the nose practically a double lock with the ends of the clamp is obtained and the nose when in locked position will have its upper surface or top, flush with that portion of the head having the V cut therein. For the purpose of separating the ends from locked relation, the underside of the head 11 and the upper side of the end 13, are each provided with cut out portions or grooves 22 which register when the ends are in locked relation, thus providing the opening 23 into which an implement can be inserted to pry the ends apart.

In the application of the clamp to a hose 24, the clamp is slipped over the hose and a wrench or other suitable implement can then be applied to the heads 11, 12, to draw them together, causing the end 19 to ride over the lug 14 and bring the nose 20 into the cut 21, thus permitting the lug 14 to snap into the groove 16 so that the double lock of the clamp is obtained.

Having described my invention, I claim—

A clamp comprising a resilient band having one of its ends formed with a tapered cut out portion, a tapering nose on the other end and means for locking said ends together, bringing the tapering nose into the tapered cut out portion to facilitate effecting the locking relation of the ends.

In testimony whereof I affix my signature.

JACOB H. COFFMAN.